(12) United States Patent
Pai et al.

(10) Patent No.: US 7,436,189 B2
(45) Date of Patent: Oct. 14, 2008

(54) REAL-TIME LOAD CURRENT DETECTING CIRCUIT FOR CPU

(75) Inventors: Chiu-Yi Pai, Taichung (TW);
Hsiang-Lung Yu, Taichung County (TW)

(73) Assignee: Universal Scientific Industrial Co., Ltd., Nan Tou (TW)

( * ) Notice: Subject to any disclaimer, the term of this patent is extended or adjusted under 35 U.S.C. 154(b) by 0 days.

(21) Appl. No.: 11/524,920

(22) Filed: Sep. 22, 2006

(65) Prior Publication Data

US 2008/0012584 A1 Jan. 17, 2008

(30) Foreign Application Priority Data

May 17, 2006 (TW) ............................. 95208457 U

(51) Int. Cl.
*G01R 31/08* (2006.01)
(52) U.S. Cl. ..................... 324/713; 324/76.11; 713/300; 323/282
(58) Field of Classification Search ................. 324/713, 324/76.11; 713/300; 323/282
See application file for complete search history.

(56) References Cited

U.S. PATENT DOCUMENTS

| 6,005,758 | A | * | 12/1999 | Spencer et al. | ................. 361/64 |
| 6,954,706 | B2 | * | 10/2005 | Poirier et al. | ................. 702/65 |
| 2004/0095114 | A1 | * | 5/2004 | Kernahan | ................... 323/282 |
| 2006/0127066 | A1 | * | 6/2006 | Chiu et al. | .................. 388/804 |

* cited by examiner

*Primary Examiner*—Vincent Q Nguyen
(74) *Attorney, Agent, or Firm*—Rosenberg, Klein & Lee

(57) ABSTRACT

A real-time load current detecting circuit composed of a power supply circuit, a delay circuit, a current sensing circuit, and a current feedback circuit. The power supply circuit is adapted for providing the CPU with a power source. The delay circuit includes a resistor and a capacitor, connected to the power supply circuit. The current sensing circuit includes a comparison circuit connected to the delay and power supply circuits. The current feedback circuit includes a feedback current source and a resistor, connected to the current sensing circuit. The feedback current source is adapted for mirroring a current sensed by the current sensing circuit. In light of this, the current can be accurately monitored and detected and there is hardly inaccuracy for the detection of the current.

11 Claims, 3 Drawing Sheets

REAL-TIME LOAD CURRENT DETECTING CIRCUIT FOR CPU

BACKGROUND OF THE INVENTION

1. Field of the Invention

The present invention relates generally to the art of detecting load current, and more particularly, to a real-time load current detecting circuit for a central processing unit (CPU).

2. Description of the Related Art

According to the prior art, a conventional power supply system having a load current detecting device for detecting load current includes a conventional load current detecting circuit 60. Referring to FIG. 2, the detecting circuit 60 technically employs a power supply 61 to provide direct current (DC) of low voltage level and provide a CPU 69 or other load devices with required electricity for operation. Further, a stored-energy inductor L6 and a stored-energy capacitor C6 are employed in cooperation with a pulse width modulation (PWM) controller 62 to control high-gate and low-gate control signals for respective controls of ON and OFF of the two switches 64, thus enabling the power supply 41 to provide the required electricity for the CPU 69. Furthermore, a resistor 66 and a conductor 67 are employed for monitoring the surface temperature of the CPU 69; specifically, it primarily employs the inductor 67 to detect the voltage drop of the resistor 66 to indirectly detect the amperage of and the variation of the voltage drop of the CPU 69.

However, the above-mentioned detecting circuit had greater inaccuracy because of employing the resistor 66 for detection or measurement of variation of the current. The solution to such drawback, i.e. control of rotational speed of the cooling fan of the CPU, fails to definitely improve it.

The above-mentioned invention was to improve the aforementioned drawback, having a current load detecting circuit 70 in addition to the conventional detecting circuit 60, as shown in FIG. 3. In light of this, the high-gate and low-gate control signals or the variation of duration of high/low levels of PWM signals can be detected to enable real-time countermeasure, i.e. the cooling fan of the CPU is controlled to run faster to enhance the heat-dissipating efficiency, to improve the drawback.

Although the aforementioned invention can monitor/detect the current, the actual detection of the current is done by the variation of the current measured by the combination of the high-gate and low-gate control signals and the PWM signals. Thus, there is still inaccuracy.

SUMMARY OF THE INVENTION

The primary objective of the present invention is to provide a real-time load current detecting circuit for a CPU, which hardly has inaccuracy while monitoring and detecting the current.

The foregoing objective of the present invention is attained by the real-time load current detecting circuit composed of a power supply circuit, a delay circuit, a current sensing circuit, and a current feedback circuit. The power supply circuit is adapted for providing the CPU with a power source. The delay circuit includes a resistor and a capacitor, connected to the power supply circuit. The current sensing circuit includes a comparison circuit connected to the delay and power supply circuits. The current feedback circuit includes a feedback current source and a resistor, connected to the current sensing circuit. The feedback current source is adapted for mirroring a current sensed by the current sensing circuit. In light of this, the current can be accurately monitored and detected and there is hardly inaccuracy for the detection of the current.

DETAILED DESCRIPTION OF PREFERRED EMBODIMENTS

Figure 1:
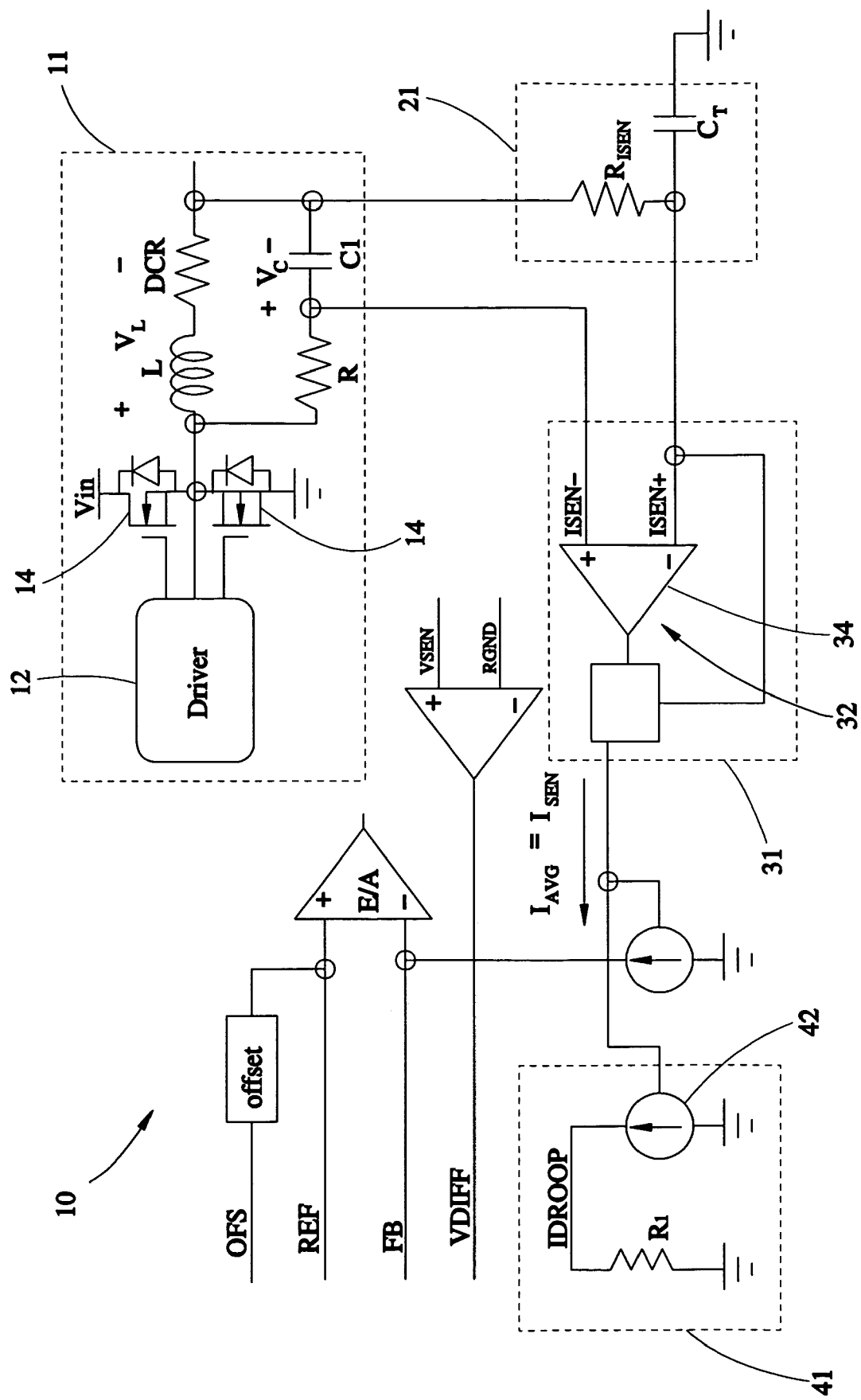
FIG. 1 is a schematic view of a circuitry of a preferred embodiment of the present invention.
Figure 2:
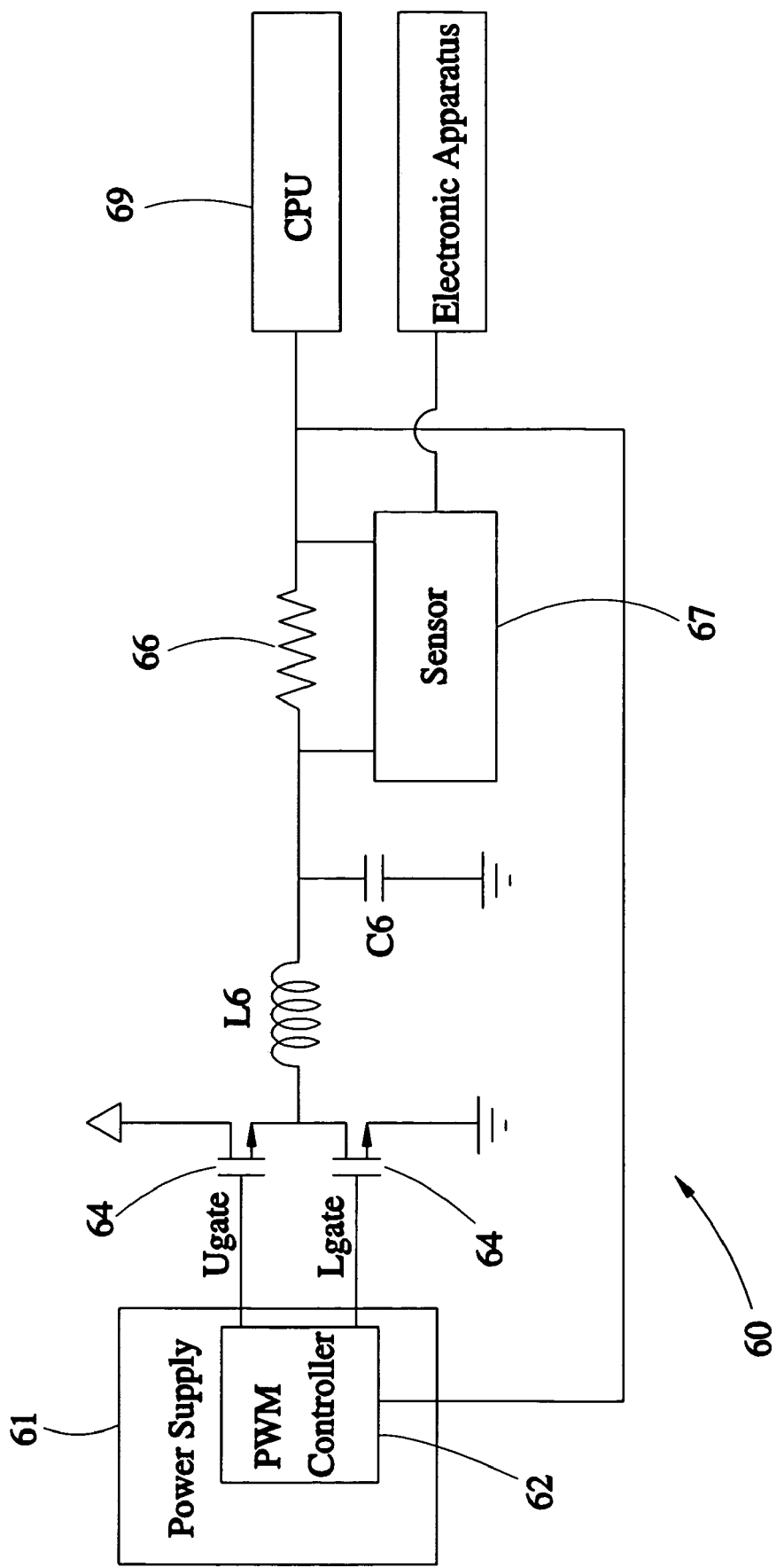
FIG. 2 is a schematic view of a conventional load current detecting device.
Figure 3:
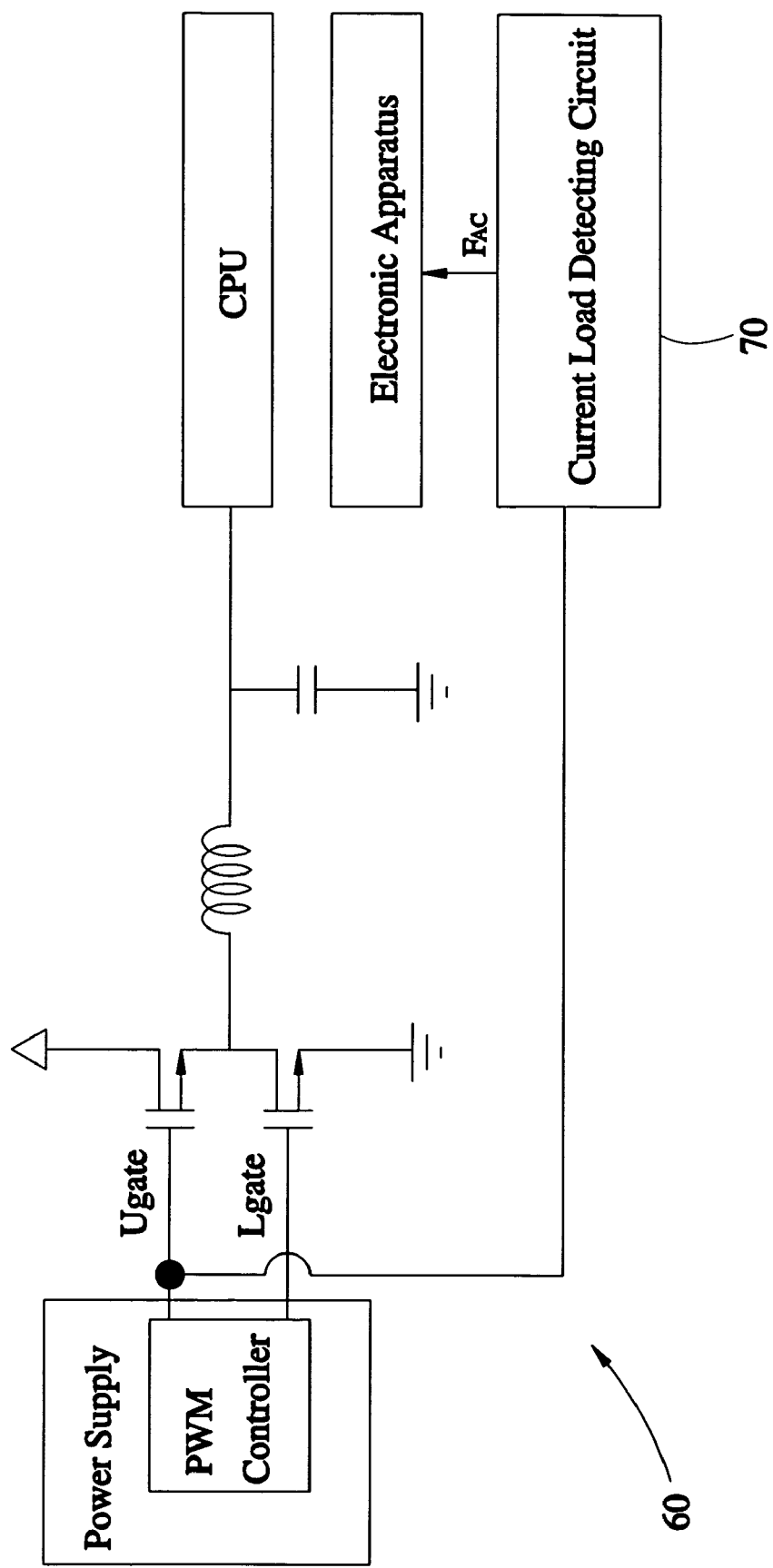
FIG. 3 is a schematic view of a conventional current load detecting device.

Referring to FIG. 1, a real-time load current detecting circuit 10 for a CPU, constructed according to a preferred embodiment of the present invention, is composed of a power supply circuit 11, a delay circuit 21, a current sensing circuit 31, and a current feedback circuit 41.

The power supply circuit 11 is adapted for providing the CPU (not shown) with a power source. The power supply circuit 11 includes a power driver 12, two switches 14, an inductor L together with an equivalent series DC resistance (DCR), and a capacitor C1. The structure of interconnection between the elements of the power supply circuit 11 is identical to that of the second conventional detecting circuit mentioned above, such that no more description is necessary.

The delay circuit 21 includes a resistor $R_{ISEN}$ and a capacitor $C_T$, which are serially connected with each other, connected to the power supply circuit 11.

The current sensing circuit 31 includes a comparison circuit 32 composed of an operational (OP) amplifier 34 and connected to the delay circuit 21 and the power supply circuit 11.

The current feedback circuit 41 includes a feedback current source 42 and a resistor R1, which are serially connected with each other, connected to the current sensing circuit 31. The feedback current source 42 is adapted for mirroring a current $I_{SEN}$ sensed by the current sensing circuit 31.

While the circuit 10 is operated, the power driver 12 provides a power source and the power source is provided through the switches 14, the inductor L, and the capacitor C1 for the CPU (not shown). Since the manner of its power supply is the same as the prior art, no tautological recitation is necessary.

The delay circuit 21 is adapted for matching the current of two input ends of the comparison circuit 32. In light of this, the amperage of the current $I_{SEN}$ can be derived from the product of a current IL of the inductor L and the ratio of the resistance DCR to the resistor $R_{ISEN}$ of the delay circuit 21. The equation (1) is shown below:

$$I_{SEN} = \frac{DCR}{R_{ISEN}} \cdot I_L$$

The current feedback circuit 41 employs the feedback current source 42 in connection with an output end of the OP amplifier 34 to detect an effective current by means of current mirror and employs the resistor R1 to detect the current of the feedback current source 42. In light of this, the resistor R1 affects neither the current of the power supply circuit 11 nor the sensed current $I_{SEN}$ calculated by the equation (1), such that accurate amperage of the current can be detected. Further, the current can be monitored and detected without any inaccuracy.

Although the present invention has been described with respect to a specific preferred embodiment thereof, it is no way limited to the details of the illustrated structures but changes and modifications may be made within the scope of the appended claims.

What is claimed is:

1. A real-time load current detecting circuit for a central processing unit (CPU), comprising:
    a power supply circuit for outputting a load current to the CPU and generating a differential voltage proportioned to the load current;
    a current sensing circuit coupled to the power supply circuit for sensing the differential voltage and converting the differential voltage into a sensed current; and
    a current mirror coupled to the current sensing circuit for receiving the sensed current and generating an output current; and
    a resistor coupled to the current mirror for receiving the output current to detect an output voltage thereacross indicative of the load current.

2. The real-time load current detecting circuit as defined in claim 1, further comprising: a delay circuit coupled between to the power supply circuit and the current sensing circuit for receiving and stabilizing the differential voltage.

3. The real-time load current detecting circuit as defined in claim 2, wherein the power supply circuit has a resonant inductor, a DC resistance series coupled to the resonant inductor, and a resonant capacitor coupled to the resonant inductor, and the power supply circuit outputs the load current to the CPU through the resonant inductor and the DC resistance, moreover, the differential voltage built on the resonant capacitor is proportioned to a voltage built on the resonant inductor.

4. The real-time load current detecting circuit as defined in claim 3, wherein the current sensing circuit has a differential amplifier and a voltage/current converter, and the differential amplifier coupled to the delay circuit for receiving and the stable differential voltage, the voltage/current converter coupled to the differential amplifier so as to convert the stable differential voltage into the sensed current.

5. The real-time load current detecting circuit as defined in claim 2, wherein the delay circuit is a RC delay circuit.

6. A real-time load current detecting circuit for a central processing unit (CPU), comprising:
    a power supply circuit for providing said CPU with a power source;
    a delay circuit having a resistor and a capacitor and connected to said power supply circuit;
    a current sensing circuit having a comparison circuit connected to said delay circuit and said power supply circuit; and
    a current feedback circuit having a feedback current source and a resistor and connected to said current sensing circuit, said feedback current source being provided for mirroring a current sensed by said current sensing circuit, said resistor being connected to said feedback current source for detection, responsive to the mirrored current, of an output voltage thereacross indicative of the load current at said power supply circuit.

7. The real-time load current detecting circuit as defined in claim 6, wherein said resistor and said capacitor of said delay circuit are interconnected.

8. The real-time load current detecting circuit as defined in claim 6, wherein said feedback current source is serially connected with said resistor of said current feedback circuit.

9. The real-time load current detecting circuit as defined in claim 6, wherein said comparison circuit includes an operational (OP) amplifier.

10. A real-time load current detecting circuit for a central processing unit (CPU), comprising:
    a power supply circuit having a resonant inductor, a DC resistance series coupled to the resonant inductor, and a resonant capacitor coupled to the resonant inductor, wherein the power supply circuit generates a load current to the CPU through the resonant inductor and the DC resistance; a voltage proportional to a voltage across the resonant inductor being generated across the resonant capacitor;
    a delay circuit coupled to the resonant capacitor of the power supply circuit for receiving and stabilizing the differential voltage generated at the resonant capacitor and outputting a stable differential voltage;
    a current sensing circuit having a differential amplifier and a voltage to current converter, wherein the differential amplifier is coupled to the delay circuit for receiving the stable differential voltage; the voltage to current converter being coupled to the differential amplifier to convert the stable differential voltage into a sensed current; and
    a current feedback circuit having a current mirror and a resistor, wherein the current mirror connects to the voltage to current converter of the current sensing circuit for receiving the sensed current and generating an output current; the resistor being connect to the current mirror for receiving the output current and detecting an output voltage thereacross indicative of the load current.

11. The real-time load current detecting circuit as defined in claim 10, wherein the delay circuit is a RC delay circuit.

* * * * *